United States Patent [19]
Rose et al.

[11] Patent Number: 6,036,153
[45] Date of Patent: Mar. 14, 2000

[54] ELONGATED NON-PIVOTABLE HOOK FOR HANGING SIGNS FROM CEILING ANCHORS

[75] Inventors: Sidney Rose, Marblehead; Alan L. Stenfors, Scituate; Michael S. Hoffman, Marblehead, all of Mass.

[73] Assignee: Rose Displays Ltd., Marblehead, Mass.

[21] Appl. No.: 08/922,429

[22] Filed: Sep. 3, 1997

[51] Int. Cl.⁷ ..................................................... B42F 13/00
[52] U.S. Cl. .......................... 248/339; 248/303; 248/302; 24/598.3
[58] Field of Search .................................... 248/302, 303, 248/304, 305, 339, 341, 493; 24/598.6, 265.4

[56] References Cited

U.S. PATENT DOCUMENTS

| | | | |
|---|---|---|---|
| 454,305 | 6/1891 | Thurston | 248/303 |
| 593,495 | 11/1897 | Redfield | 24/362 H |
| 785,381 | 3/1905 | Robin | 248/303 |
| 2,608,733 | 9/1952 | Wilber | 24/302 |
| 3,982,719 | 9/1976 | Kilborne | 248/489 |

*Primary Examiner*—Derek J. Berger
*Assistant Examiner*—Kimberly Wood
*Attorney, Agent, or Firm*—Don Halgren

[57] ABSTRACT

The present invention comprises an elongated plastic hook assembly for the support of a sign or the like from an anchor secured to an elongated ceiling tile support member. The elongated hook assembly includes an elongated shaft having a first or upper end and a second or lower end with a first connection means arranged at the first or upper end of the elongated shaft and a hook member arranged at the second or lower end of the elongated shaft. The hook member and the elongated shaft have an annular locking segment connectively arranged therebetween. A web extends across the hook member to provide line of support for any further hook assembly saddled thereon, to minimize movement between any hook assemblies so connected.

4 Claims, 5 Drawing Sheets

ELONGATED NON-PIVOTABLE HOOK FOR HANGING SIGNS FROM CEILING ANCHORS

BACKGROUND OF THE INVENTION

1. Field of the Invention

This invention relates to plastic hooks, and more particularly, hooks which are arranged to be suspended from a ceiling anchor in a singular or chain link arrangement, to hold a sign.

2. Prior Art

Retail signs are held typically, from ceiling anchors, which anchors are themselves attached to ceiling support rails. Such anchors are typically attached to those rails by an apparatus as shown in U.S. Pat. 5,267,764, which is incorporated herein by reference. The ceiling anchors are designed so as to permit a slight angularity of a suspended hook, with respect to the perpendicular of the ceiling anchor.

One such type of elongated hook, is shown in U.S. Pat. No. 5,480,116 to Callas, which is utilized to hold up a sign from a ceiling rail. Unfortunately, this particular elongated ceiling hook does not permit any non-perpendicular alignment of the support hook between the anchored mechanism and the sign. Should a plurality of elongated hooks be joined to one another in this particular patent, there is no arrangement to prevent the lower hooks from swinging relative to the upper hooks to which they are attached.

Such a similar situation is shown in U.S. Design Pat. No. 364,799 to Callas. The upper end of each elongated hook is locked into a channel, in which the elongated hook is not permitted any angular disposition, therewith, except perpendicularity. The lower end of the elongated hook is not arranged so as to prevent any swinging motion of a subsequently attached hook thereat.

It is an object of the present invention, to overcome the disadvantages of the prior art.

It is a further object of the present invention, to provide an elongated hook which may be pivotable at an upper end, with respect to a ceiling anchor, or to a lower elongated hook which may be attached thereto.

BRIEF SUMMARY OF THE INVENTION

The present invention relates to elongated thin diameter plastic hooks, having an overall length of anywhere from several inches to several feet. The shaft diameter is approximately about 0.125 inches, and is made from a heat formable plastic resin, made by molding or the like.

A preferred embodiment of the present elongated hook invention, has a first end, having a walled structure thereat, of generally tear drop shape in cross section. The walled structure having a wide diameter at its lowermost end, which is attached to the upper end of the shaft of the elongated hook. The tear dropped shape walled structure has a narrower upper end, having a pin disposed transversely there across.

The elongated hook, in this third embodiment, has a second or lowermost end with a curved hook thereon. The curved hook, has an annular section where the elongated shaft joins the hook. The hook has a lowermost portion and a distal tip finger directed towards the first end of the elongated shaft. The distal tip end of the hook, has an "L-shaped" finger thereon. The hook is designed to be flexible so that the "L-shaped" finger is insertable and removable from the opening of the annular segment at the juncture of the hook and lowermost portion of the shaft. The lowermost portion of the hook, defining a U-shaped bend, has a thin plastic web extending generally there across. The web of plastic may have a narrow U-shaped "relief" slot in it to permit the hook to be bent without distorting the web, or breaking it. The web has an uppermost generally linear edge extending between the widest portions of the hook. As the L-shaped finger is inserted into the opening of the annular segment, the U-shaped portion of the lower end of the hook is rotated slightly so that the generally linear edge of the web is perpendicular to the longitudinal axis of the shaft of the elongated hook. This linear edge of the web, provides a ridge for a subsequent upper end of a further hook or sign clip to be attached thereat, without rocking or twisting.

A further embodiment of the present invention contemplates a first end of the elongated hook assembly without any tear drop shaped wall structure thereon. This further embodiment contemplates a U-shaped hook on the first end having an L-shaped finger and an annular member arranged between the elongated shaft and the arm of the U-shaped hook at its upper end. In this embodiment, there is no tear dropped shaped wall structure or transverse pin, but a U-shaped wide end with an interlocking hook as aforementioned. The second or lower end of the elongated hook in this embodiment, is similar to that of the aforementioned embodiment, with the plastic web extending generally transversely across the widest end thereof. This particular embodiment permits its uppermost end to engage the second end of the split web of the first embodiment, so as to provide a series of elongated hooks suspendable from a ceiling anchor.

In yet a further preferred embodiment of the present elongated hook invention, there is contemplated an annular segment disposed on the hook shaft at the juncture of the lower end of the elongated shaft and the first leg of the U-shaped hook, the annular segment being arranged to permit the snap locking of the hook member thereat. The annular segment comprises a generally C-shaped portion having a face surface of flat shape, in planar alignment with the plane defined by the U-shaped hook thereadjacent. A raised abutment or button, is placed at a midpoint on the flat surface of the C-shaped portion of the annular section. The raised abutment has a lip which defines an undercut portion facing the opening of the annular segment. The second or flexible leg of the U-shaped hook has a distal finger segment which lies in the same plane as the U-shaped hook itself. The distal finger segment is of the generally L-shape, having a generally triangularly shaped web at its corner, which web engages the undercut lip of the button on the C-shaped portion of the annular segment when the second leg of the U-shaped hook is biased therearound. Thus, the distalmost edge of the second leg is enabled to lock in a mating arrangement with the lip on the raised button, so as to engage and prevent any object hooked therewithin from slippage therefrom.

The invention thus comprises an elongated plastic hook assembly for the support of a sign or the like from an anchor secured to an elongated ceiling tile support member, the elongated hook assembly comprising an elongated shaft having a first of upper end and a second or lower end. A first connection means is arranged at the first end of the elongated shaft, and a hook member arranged at the second or lower end of the elongated shaft, the hook member and the elongated shaft having an annular locking segment connectively arranged therebetween. A web extends across the hook member to provide line of support for any further hook assembly saddled thereon, to minimize movement between any hook assemblies so connected. The elongated plastic hook assembly includes a slot arranged in the web to permit the emplacement of a first or upper end of a further hook assembly therewithin, so as to permit the forming of a series or chain of hook assemblies, for extending sign support from a ceiling anchor. The connection means comprises a tear drop shaped wall structure having a wide lower end and a narrow upper end. The narrow end has an inner surface arranged so as to permit the narrow end of the tear drop walled structure to ride as a saddle over the web of a further hook assembly. The connection means may comprise a "J" shaped hook member. The "J" shaped hook member has an annular locking segment at the juncture of the hook member and the elongated shaft, so as to permit the hook member to be lockable and unlockable. The "J" shaped hook member has a annular locking segment having an opening therethrough, the finger being arranged to extend into the opening to lock the distal end of the hook member onto the annular segment. The "J" shaped hook member may also have, in a further embodiment, a second leg having a distal end with a finger thereat, the annular locking segment having a raised button thereon. The raised button having a lip portion defining an undercut section, wherein flexure and bending of the distal end of the second leg permits locking of the leg under the lip to effect locking of the hook member.

The connection means may include a pin which extends perpendicular to the longitudinal axis of the elongated shaft of the hook assembly, so as to permit the hook assembly to be secured to a ceiling anchor in a pivotable and rotatable manner. The ceiling anchor may comprise a planar member with securement means thereon to permit the anchor to be attached to a ceiling support rail, the ceiling anchor having a central opening therein through which the hook assembly is suspended. The central opening in the anchor preferably has a stepped shoulder therearound, to permit the pin riding on the stepped shoulder to maintain said hook assembly secured thereto.

The invention also comprises a method of supporting a sign or the like from an anchor member secured to an elongated ceiling tile support member, the method comprising the steps of providing a first hook assembly with an elongated shaft having a first or upper end and a second or lower end; arranging a first connection means at the first end of the elongated shaft; and molding a hook member arranged at the second or lower end of the elongated shaft, the hook member and the elongated shaft having an annular locking segment connectively arranged therebetween; inserting the hook member through a sign securement opening or an open upper end of a further hook assembly; flexing the hook into matable engagement with the annular locking segment to permit a sign to be lockably mated thereto, and supported from the anchor member in the ceiling tile support member.

The method includes the step of arranging a locking means between the hook member and the annular locking segment. The locking means comprises an "L" shaped finger disposed on the distal end of the hook, which "L" shaped member mates with the annular locking segment, to secure the hook member in a closed, locked configuration. The locking means may comprise a raised abutment with a lip undercut portion, the hook member engaging the undercut lip portion to secure the hook member in a closed, locked configuration. The method includes the steps of attaching a lower end of a further hook assembly to the upper end of the first hook assembly; and locking the lower end of the further hook assembly to the upper end of the first hook assembly, so as to permit the extension of the sign to yet a lower location from the ceiling anchor than would be accomplished with the first hook assembly alone. The method includes the steps of arranging a web across the distalmost section of the hook member of the further hook assembly, to permit the upper end of the first hook assembly to properly and non-rotatively engage the lower end of the further hook assembly

BRIEF DESCRIPTION OF THE DRAWINGS

The objects and advantages of the present invention will become more apparent when viewed in conjunction with the following drawings in which.

DESCRIPTION OF THE PREFERRED EMBODIMENT

The present invention relates to elongated thin diameter plastic hook assemblies 10, having an overall length of anywhere from several inches to several feet, for the support of a sign "S" or the like, the upper end of such elongated hook assembly 10 being attached to a ceiling anchor 12, the other or lower end of such hook assembly being attached to the sign "S". The shaft diameter of the hook assembly 10 being approximately about 0.125 to about 0.195 inches, and is made from a heat formable plastic resin, made by molding or the like.

Figure 2:
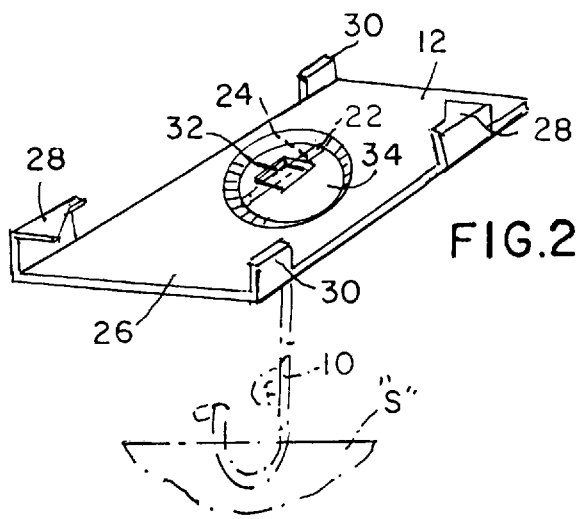
FIG. 2 is a perspective view of an anchor assembly which would be utilized to support an elongated hook of the present invention.
Figure 1:
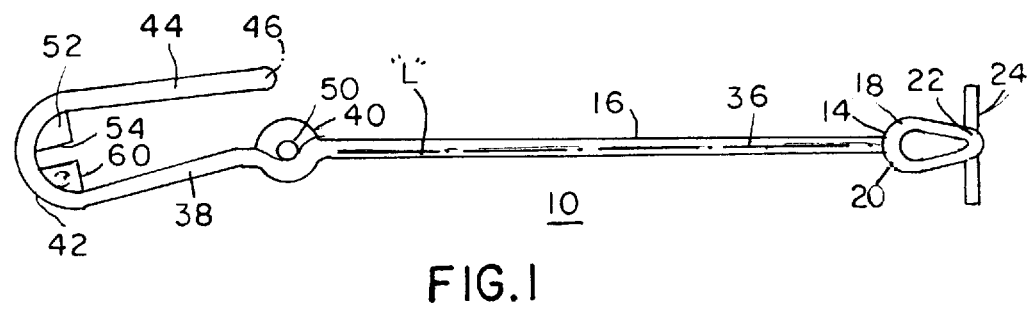
FIG. 1 is a plan view of a first embodiment of the elongated hook of the present invention.

A first preferred embodiment of the present elongated hook assembly 10 has a first end 14 attached to an elongated shaft 16 of the hook assembly 10. The first end 14 includes a hollow linear walled structure 18 thereat, of generally tear drop shape in cross section, as shown in FIG. 1. The tear drop shape walled structure 18 has a wide diameter at its lowermost end 20, which lowermost end 20 is attached to the upper end 14 of the shaft 16 of the elongated hook assembly 10. The tear dropped shape walled structure 18 has a narrower upper end 22. A pin 24 is arranged transversely across the upper end 22 of each side of the tear drop shaped walled structure 18, to act as a support in a ceiling anchor 12, as may be seen in FIG. 2. The ceiling anchor 12 is a rectangular planar member 26 having U shaped channel clips 28 on two diagonal corners, with a ridge projection 30 on the other two diagonal corners. The U shaped channel clips 28 engage the edge of a T shaped ceiling support member (not shown) when the anchor 12 is twistedly secured thereto. An opening 32 is arranged in the center of the anchor 12, with a stepped shoulder 34 therein. The pins 24 extend transversely from the upper end 22 of the tear drop shaped walled structure 18 ride on the uppermost surface of the stepped shoulder 34, and permit the elongated hook assembly 10 to be held within the opening 32 in the anchor 12, which itself is secured to a ceiling support member.

The elongated hook assembly 10, in this preferred embodiment, has a second or lowermost end 36 with a curved hook member 38 thereon. The curved hook member 38 has an annular segment 40 where the elongated shaft 16 joins the hook member 38. The hook member 38 comprises a "J" shaped lowermost portion 42 having a distal tip leg or end 44 directed towards the first end 14 of the elongated shaft 16. The distal tip end 44 of the hook member 38, has a finger 46 thereon, which finger 46 extends perpendicular to the plane of the "J" shaped lowermost portion 42 of the hook member 38. The hook member 38 is arranged to be flexible so that the finger 46 is insertable and removable from a receiving opening 50 of the annular segment 40 at the juncture of the hook assembly shaft 16 and the hook member 38 at the lowermost portion of the shaft. The lowermost portion 42 of the hook member 38 defines a U-shaped bend, and has a thin plastic web 52 extending generally thereacross, as may be seen in FIGS. 1, 3 and 4. The web 52 of plastic may have a narrow U-shaped "relief" slot 54 in it to permit the hookmember 38 to be bent (flexed) without distorting the web 52, or breaking the hook member 38. The web 52 has an uppermost generally linear edge 56 extending across the widest portions of the hook member 38 as shown most clearly in FIG. 4. As the finger 46 on the distal end of the hook member 38 is inserted into the opening 50 of the annular segment 40, the U-shaped portion 42 of the lower end of the hook member 38 is rotated slightly so that the generally linear edge of the web 52 is perpendicular to the longitudinal axis "L" of the shaft 16 of the elongated hook assembly 10, as shown by the dashed line 60 in FIG. 1, (so that 54 and 56 coincide). This linear edge 56 of the web 52 provides a ridge for a subsequent upper end of a tear drop shaped wall structure of a further hook assembly 10 to ride like a saddle thereon, when the two hook assemblies are mated, without rocking or twisting the further hook.

Figure 3:
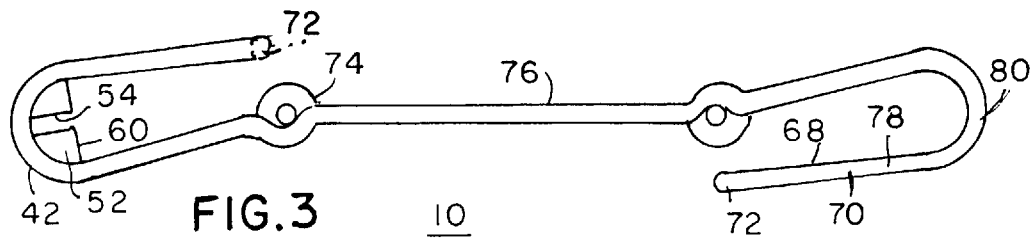
FIG. 3 is a plan view of a further embodiment of an elongated hook for the present invention.
Figure 4:
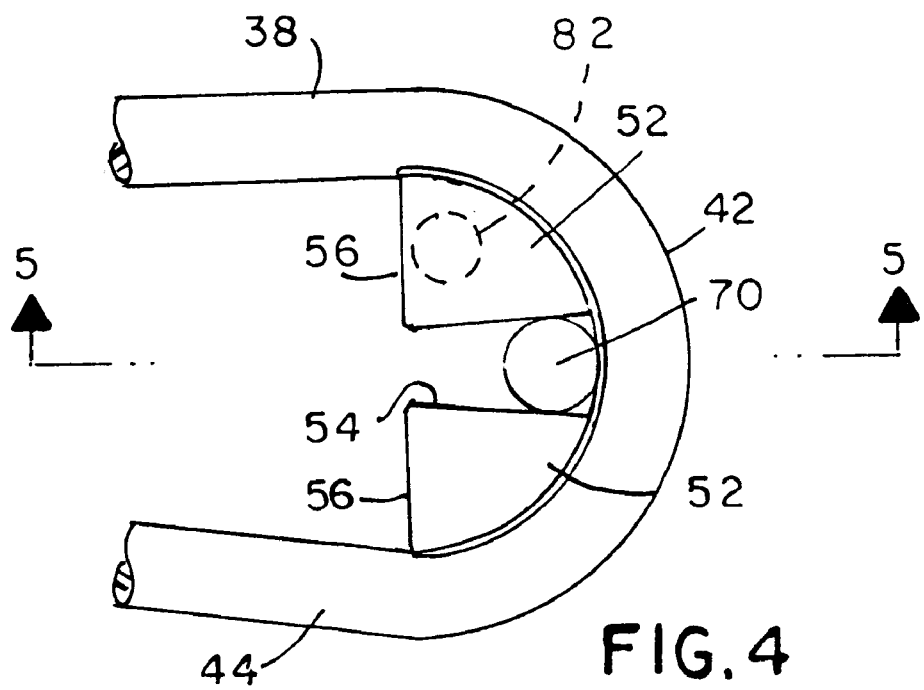
FIG. 4 is an enlarged view of the second or lowermost end of the elongated hook of the present invention.
Figure 5:
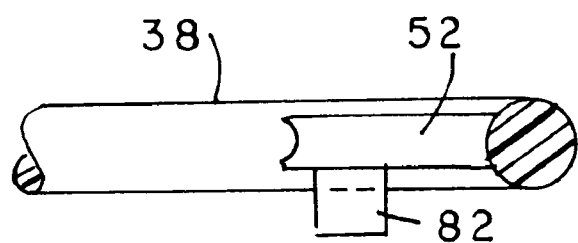
FIG. 5 is a sectional view taken along the lines 5—5 of FIG. 4.

A further embodiment of the present hook assembly 10 contemplates a first end 68 of the elongated hook assembly 10 without any tear drop shaped wall structure thereon, may be seen in FIG. 3. This further embodiment contemplates a U-shaped hook member 70 on the first end 68 having a finger 72 perpendicular to the plane of the hook member 70 and an annular locking segment 74 arranged between the elongated shaft 76 and the first arm 78 of the U-shaped hook at its upper end. The first end 68 of this embodiment of the hook assembly 10 is similar to the hook member 38 shown in FIG. 1, but without the web 52 therewith. In this further embodiment, there is no tear drop shaped wall structure or transverse pin, but it does have a U-shaped wide end with an interlocking hook finger as aforementioned. The second or lower end 80 of the elongated hook assembly 10 in this embodiment, is similar to the second or lower end 42 of the hook member 38 of the aforementioned embodiment of FIG. 1, with the plastic web 52 extending generally transversely across the widest end thereof. This particular further embodiment permits its uppermost end to engage and fit within the slot of the second or lowermost end of the web of the first embodiment, so as to permit a series of elongated hook assemblies to be suspendable from a ceiling anchor. A hook member 70 engaging the slot 54 is shown in cross section in FIG. 4. The view shown in FIG. 5 is a cross section of a portion of the hook member 38 shown in FIG. 4, with an alignment pin 82 extending perpendicularly from one side of one section of the web 52. The alignment pin 82 prevents side to side swinging motion of any further tear drop shaped wall structure 18 of a further hook assembly 10 saddled over the web 52.

Figure 6:
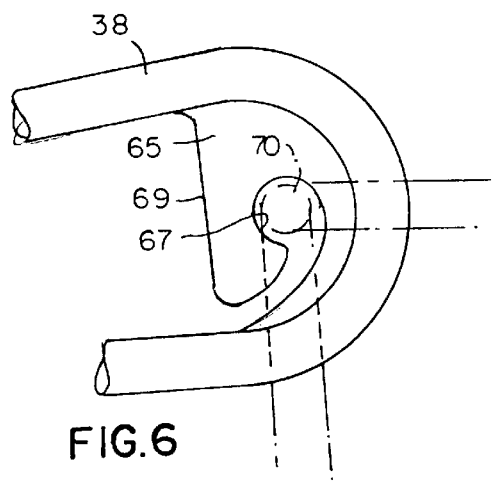
FIG. 6 is an enlarged view of the second or lowermost end of an alternative embodiment of the elongated hook shown in FIG. 4.

FIG. 6 shows a further embodiment of the hook member 38, with a thin plastic web 65 extending across the distalmost or lowermost end thereof. The web 65 has a comma shaped slot 67 formed therein, to provide a linear edge 69 for engagement and non-pivotable connection with a first wall structure 18 or upper end of a further hook assembly, or the slot 67 providing a gap into which a hook member 70 may mate.

Figure 7:
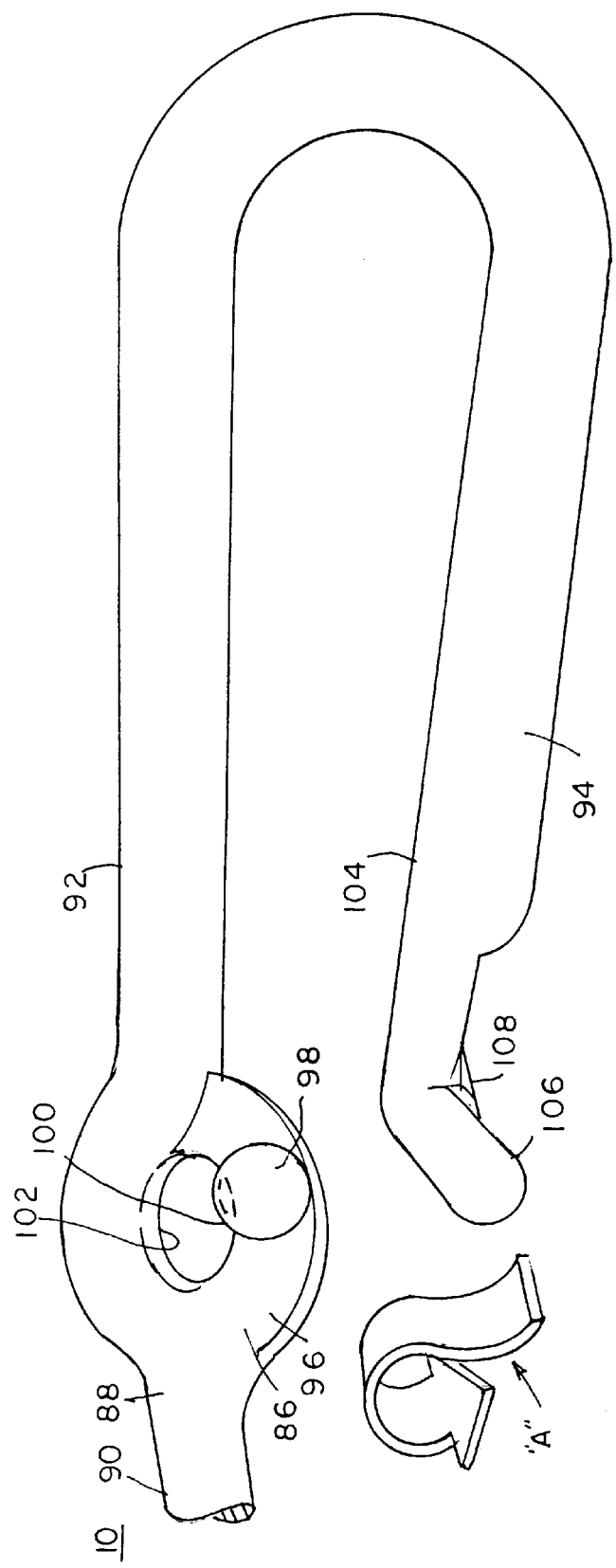
FIG. 7 is a perspective view of the second or lowermost end of an elongated hook having a further locking segment arranged therein.

In yet a still further preferred embodiment of the present elongated hook assembly 10, there is contemplated an annular segment 86 disposed on the hook shaft at the juncture of the lower end 88 of the elongated shaft 90 and the first leg 92 of the "J"-shaped hook member 94, as shown in FIG. 7. The annular segment 86 is arranged to permit the snap locking of the hook member 94 thereat. The annular segment 86 comprises a generally "O"-shaped portion, half of which has a flat or planar face surface 96, which surface 96 is in parallel alignment with the plane defined by the "J"-shaped hook member 94 thereadjacent. A raised abutment or button 98 is disposed at a midpoint on the flat surface 96 of the "C"-shaped portion of the annular segment 86. The raised abutment 98 has a lip 100 which defines an undercut portion facing a receiving opening 102 of the annular segment 86. The second or flexible leg 104 of the "J"-shaped hook member 94 has a distal finger segment 106 which finger segment 106 lies in a plane which is parallel to the plane as the "J"-shaped hook member 94 itself. The distal finger segment 106 is of the generally L-shape, having a generally triangularly shaped web 108 at its corner, as shown in FIG. 6.

The web 108 may engage the undercut lip 100 of the button 98 on the C-shaped portion of the annular segment 96 when the second leg 104 of the "J"-shaped hook 94 is biased therearound, in a direction by the arrow "A", or generally perpendicular to the elongated shaft 90, as shown in FIG. 7. Thus, the distalmost edge of the second leg 104 is enabled to lock in a mating arrangement with the lip 100 on the raised button 98, so as to engage and prevent any object hooked therewithin from slippage therefrom.

Figure 8:
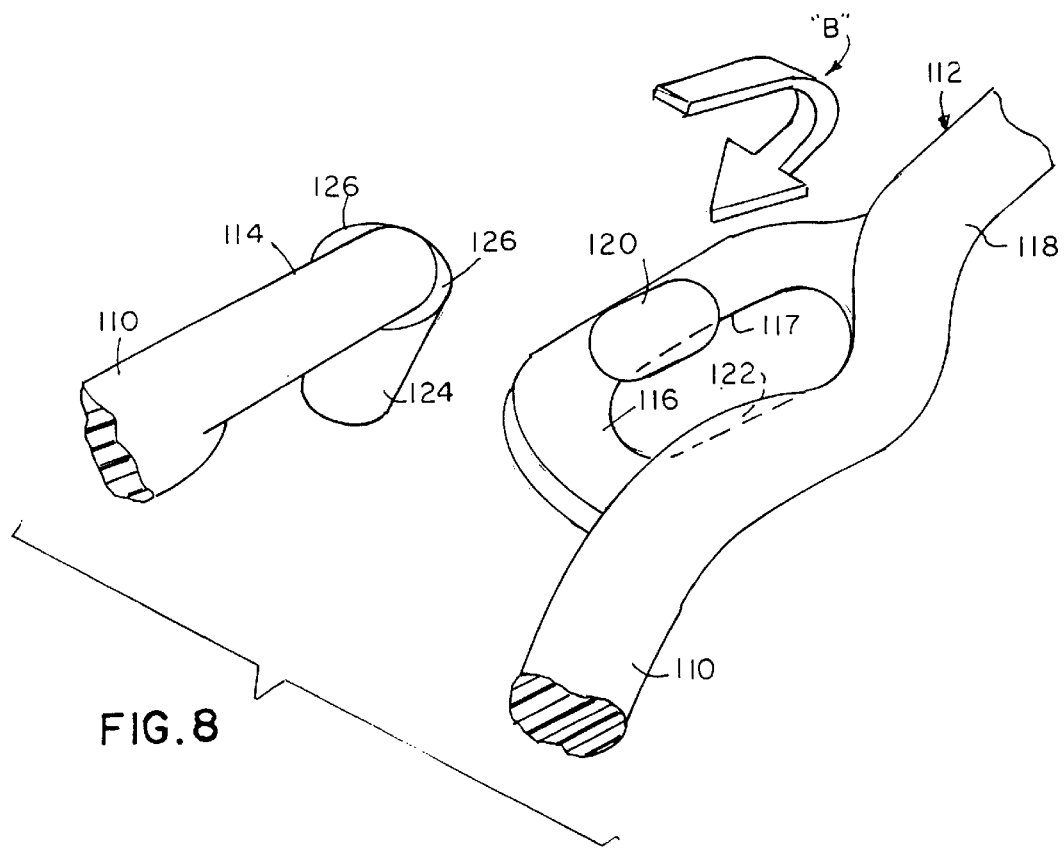
FIG. 8 is a perspective view of a yet further embodiment of the locking segment of an elongated hook.

FIG. 8 discloses yet a further locking embodiment, wherein the second or lowermost end 110 of a hook assembly 112 has a finger 114. An elongated oval segment 116 is arranged at the juncture of the shaft 118 and the lowermost end 110 to define an elongated receiving opening 117. A dimple 120 is molded to one side of the oval segment 116 as shown in FIG. 8. A flange or lip 122 is disposed on the oval segment 116, across from the dimple 120. The finger 114 has a side extension 124 arranged perpendicular to the oval segment 116. The extension 124 has a pair of edges 126 which extend beyond the sides of the finger 114, as shown in FIG. 8. The finger 114 is flexible, and is flexed in a direction of the arrow "B", or generally parallel to the elongated shaft 118 of the hook assembly 112, so as to permit the extension 124 to slidingly mate in the receiving opening 117 and lock under the dimple 120, or disengage with respect to the elongated central receiving opening 117 defined by the oval segment 116. The edges 126 on the extension are held in abutting engagement with the lip 122 and the side of the dimple 120, thus preventing the opening of the hook member without reversing the direction of movement of the finger 114, from the oval segment 116.

Figure 9A:
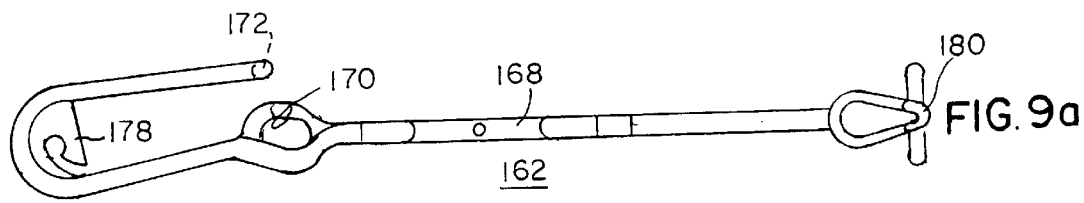
FIGS. 9a and 9b in a plan and a side view, show a further embodiment of the elongated hook arrangement using an elongated opening, and with a T-bar, a hook and web.
Figure 9B:
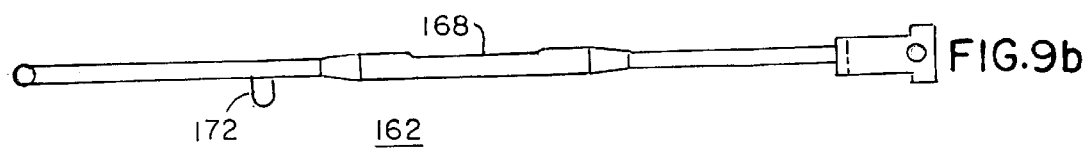
Figure 10A:
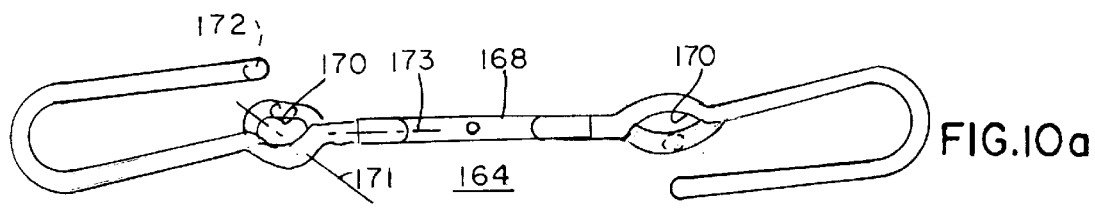
FIGS. 10a and 10b in a plan and a side view show the further embodiment of the elongated hook arrangement with hooks at both ends.
Figure 10B:
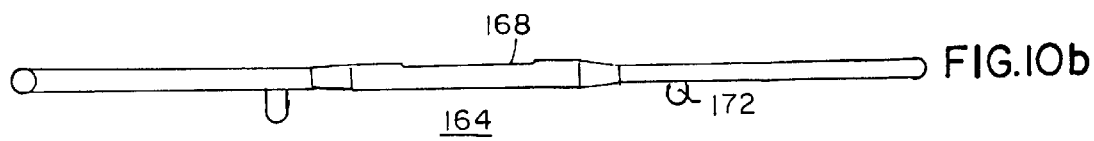
Figure 11A:
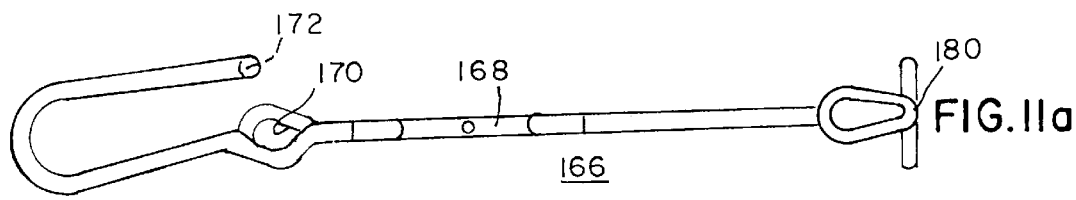
FIGS. 11a and 11b in a plan and a side show the further embodiment of the elongated hook arrangement with a hook and T-bar combination thereon.
Figure 11B:
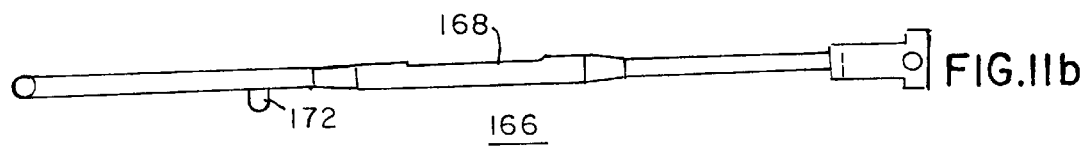

A yet further embodiment of the elongated hook arrangement is shown in FIGS. 9 a, 9 b, 10 a, 10 b, 11 a and 11 b, wherein the central body portion 160 of each elongated hook arrangement 162, 164 and 166 has a flattened portion 168 for indicia designation and rigidity for the hook itself, and an elongated receiving opening 170 of about 0.25 to 0.35 inches long and about 0.12 to about 0.20 inches wide with a long axis 171 disposed at an angle of about 10 to 15 degrees with respect to the longitudinal axis 173 of the body portion 160 of the hook arrangement 162. The angular disposition of the receiving openings 170 with respect to the axis of the body portion 160 permits snug and easy mating between the finger 172 and those openings 170 when they are being joined or disconnected. The finger 172 is arranged perpendicular to the plane of the receiving opening 170, as may be seen from the figures. FIGS. 9 a and 9 b and 11 a and 11 b, showing an elongated hook arrangements 162 and 166, for support from a ceiling anchor similar to that shown in FIG. 2, FIGS. 10 a and 10 b showing an elongated hook arrangement 164 as an intermediate connector hook for interconnecting other hook arrangements between a ceiling anchor and a sign to be supported form such a ceiling anchor. The lowermost hook end 176 of the hook arrangement 162 shown in FIG. 9 a is shown with a web 178 and a T-bar uppermost end 180, similar to those described in earlier embodiments Thus unique locking and engagement arrangements are disclosed with elongated hook assemblies to permit signs or the like to be suspended from ceiling anchors. The hook assemblies are arranged to permit multiple elongated hook assemblies to be strung together without twisting between one another, in an improved manner.

We claim:

1. A first elongated plastic hook assembly for the support of a sign from an anchor member secured to an elongated ceiling tile support member, said elongated hook assembly comprising:

an elongated shaft having a first or upper end and a second or lower end;

a first connection means arranged at said first end of said elongated shaft;

a hook member arranged at said second or lower end of said elongated shaft, said hook member and said elongated shaft having an annular locking segment connectively arranged therebetween; said hook being flexibly arranged so as to be matable in said annular locking segment to permit a sign or a successive hook assembly to be mated thereto; and a web extending across said hook member to provide line of support for any further hook assembly saddled thereon, to minimize movement between hook assemblies connected thereon.

2. The elongated plastic hook assembly for the support of a sign as recited in claim 1, including:

a slot arranged in said web to permit the emplacement of a first or upper end of the further hook assembly therewithin, so as to form a series or chain of hook assemblies, for extending sign support from a ceiling anchor.

3. The elongated plastic hook assembly for the support of a sign as recited in claim 2, wherein said first connection means comprises a tear drop shaped wall structure having a wide lower end and a narrow upper end, said narrow end having an inner surface arranged so as to permit said narrow end of said tear drop walled structure to ride as a saddle over said web of a further hook assembly.

4. The elongated plastic hook assembly for the support of a sign as recited in claim 3, wherein said connection means includes a pin which extends perpendicular to the longitudinal axis of said elongated shaft, so as to permit said hook assembly to be secured to a ceiling anchor in a pivotable and rotatable manner.

* * * * *